US012645688B1

(12) United States Patent
Shankar et al.

(10) Patent No.: US 12,645,688 B1
(45) Date of Patent: *Jun. 2, 2026

(54) SYSTEMS AND METHODS FOR RULE MANAGEMENT

(71) Applicant: Palantir Technologies Inc., Denver, CO (US)

(72) Inventors: Ankit Shankar, San Francisco, CA (US); Darren Zhao, New York, NY (US); Kayo Teramoto, Washington, DC (US); Matthew Hawes, London (GB); Thomas Mathew, Livonia, MI (US); Fatih Cataltepe, Cambridge (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,255

(22) Filed: Jun. 30, 2023

Related U.S. Application Data

(63) Continuation of application No. 17/249,397, filed on Mar. 1, 2021, now Pat. No. 11,783,269.

(60) Provisional application No. 63/199,967, filed on Feb. 5, 2021.

(51) Int. Cl.
*G06F 16/248* (2019.01)
*G06F 3/0482* (2013.01)
(52) U.S. Cl.
CPC .......... *G06F 16/248* (2019.01); *G06F 3/0482* (2013.01)

(58) Field of Classification Search
CPC ............................. G06F 16/248; G06F 3/0482
See application file for complete search history.

(56) References Cited

U.S. PATENT DOCUMENTS

| | | | |
|---|---|---|---|
| 10,810,361 B1 | 10/2020 | Venkatraman et al. | |
| 11,783,269 B1 | 10/2023 | Shankar et al. | |
| 2006/0074915 A1 | 4/2006 | Bhandarkar et al. | |
| 2006/0195798 A1 | 8/2006 | Chan et al. | |
| 2008/0120574 A1 | 5/2008 | Heredia et al. | |
| 2008/0256014 A1 | 10/2008 | Gould et al. | |
| 2012/0136822 A1 | 5/2012 | Selman | |
| 2018/0024701 A1 | 1/2018 | Sanches et al. | |
| 2018/0081905 A1 | 3/2018 | Kamath et al. | |
| 2018/0349134 A1 | 12/2018 | Studer et al. | |
| 2019/0032948 A1 | 1/2019 | Nayak et al. | |
| 2020/0356579 A1 | 11/2020 | Anderson et al. | |
| 2021/0243148 A1 | 8/2021 | Moore et al. | |
| 2022/0215303 A1 | 7/2022 | Thiruvengadathan et al. | |
| 2022/0222675 A1* | 7/2022 | Sandepudi | ............... G06N 5/01 |
| 2022/0230119 A1* | 7/2022 | Liang | ............... G06Q 10/06375 |

* cited by examiner

*Primary Examiner* — Andrew T Chiusano
(74) *Attorney, Agent, or Firm* — Knobbe, Martens, Olson & Bear, LLP

(57) ABSTRACT

A computer system may be configured to access a rule including one or more conditions, providing a user interface configured for user input of a modification to a condition of the rule, receive from a user, via the user interface, a modification to a first condition of the rule constituting a first changed condition, wherein the first changed condition is associated with a modified rule, determine an output data set, based on an input data set including a plurality of past data samples, and the first changed condition of the modified rule, and update the user interface to include a visualization indicating at least some of the output data set.

8 Claims, 10 Drawing Sheets

800

SYSTEMS AND METHODS FOR RULE MANAGEMENT

INCORPORATED BY REFERENCE TO ANY PRIORITY APPLICATIONS

This application is a continuation of U.S. patent application Ser. No. 17/249,397 entitled "SYSTEMS AND METHODS FOR RULE MANAGEMENT", filed Mar. 1, 2021, which claims benefit of U.S. Application No. 63/199,967 entitled "SYSTEMS AND METHODS FOR RULE MANAGEMENT", filed Feb. 5, 2021, which are hereby incorporated by reference in their entireties.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, the present disclosure relates to a rule editing and proposal reviewing system that may be configured to enable subject matter experts and non-coders to create, edit, test, manage, and view business logic and rules.

BACKGROUND

Existing business rules and logic management systems require that subject matter experts (e.g., experts in supply chain management, oil and gas, healthcare administration, etc.) and coders work together to implement and maintain the business rules and logic. This is because most rules must be expressed and maintained in code. However, many subject matter experts lack the time and/or technical skill to personally and manually create and review the code for business rules and logic, instead relying on coders. This prevents subject matter experts from easily managing, creating, and reviewing existing rules and new rule proposals. These rules can represent vital information related to alerts, data categories, and other important data that can be represented by business rules.

Not only does the subject matter expert have to rely on coders to implement the business logic correctly, but the subject matter expert will also have to rely on coders to analyze the existing and updated rule outcomes for efficacy and efficiency. In this way, the code representation of rules may require coders to translate between the real-world and code representations of rules and the corresponding outcomes.

This problem is further compounded by the potential need for analysis from multiple data analysis systems. The subject matter expert may need to understand the implications of a new rule or a change to an existing rule quickly, potentially in real-time. Translating rule outcomes between multiple data analysis tools can help the subject matter expert understand the implications and ramifications of a rule, but this translation may require significant coding skills and time.

SUMMARY

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Systems and methods are described for data integration, analysis, and visualization. One innovation includes a computerized method, performed by a computing system having one or more hardware computer processors and one or more non-transitory computer readable storage device storing software instructions executable by the computing system to perform the computerized method. The method includes accessing a rule including one or more conditions, providing a user interface configured for user input of modifications to conditions of the rule, receiving from a user, via the user interface, a modified rule including a modification to a first condition of the rule, determining a first output data set, based on application of the modified rule, including the modification to the first condition, to an input data set including a plurality of data samples, determining a second output data set, based on application of the rule, including the first condition, to the input data set, updating the user interface to include a visualization indicating at least some of the first output data set and at least some of the second output data set.

Various embodiments include other aspects. The method may further include receiving user input requesting that the modified rule replace the rule, providing, to at least a second user, an indication of the modified rule, in response to receiving an acceptance indication from the second user, replacing the rule with the modified rule, and in response to not receiving an acceptance indication from the second user, continuing to use the rule without the change to the first condition. The indication of the modified rule may include a visual cue of the first changed condition of the modified rule. The visualization may allow simultaneous viewing of one or more changed values between the first output data set and the second output data set. The method may further include generating an alert based on the modified rule. The rule may be stored as an object in an ontology of objects. The object storing the rule may be an intermediate representation usable by each of a plurality of data visualization applications to generate a variety of visualization types. The visualization types may include one or more of a data set, time series, graph, object, or series of database rules. Receiving from the user, via the user interface, the modified rule may include displaying a drop-down menu of pre-populated choices.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments including one or more aspects of the appended claims.

In various embodiments, computer-implemented methods are disclosed in which, by one or more processors executing program instructions, one or more aspects of the above- and/or below-described embodiments including one or more aspects of the appended claims are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments including one or more aspects of the appended claims.

DETAILED DESCRIPTION

Overview

Figure 1:
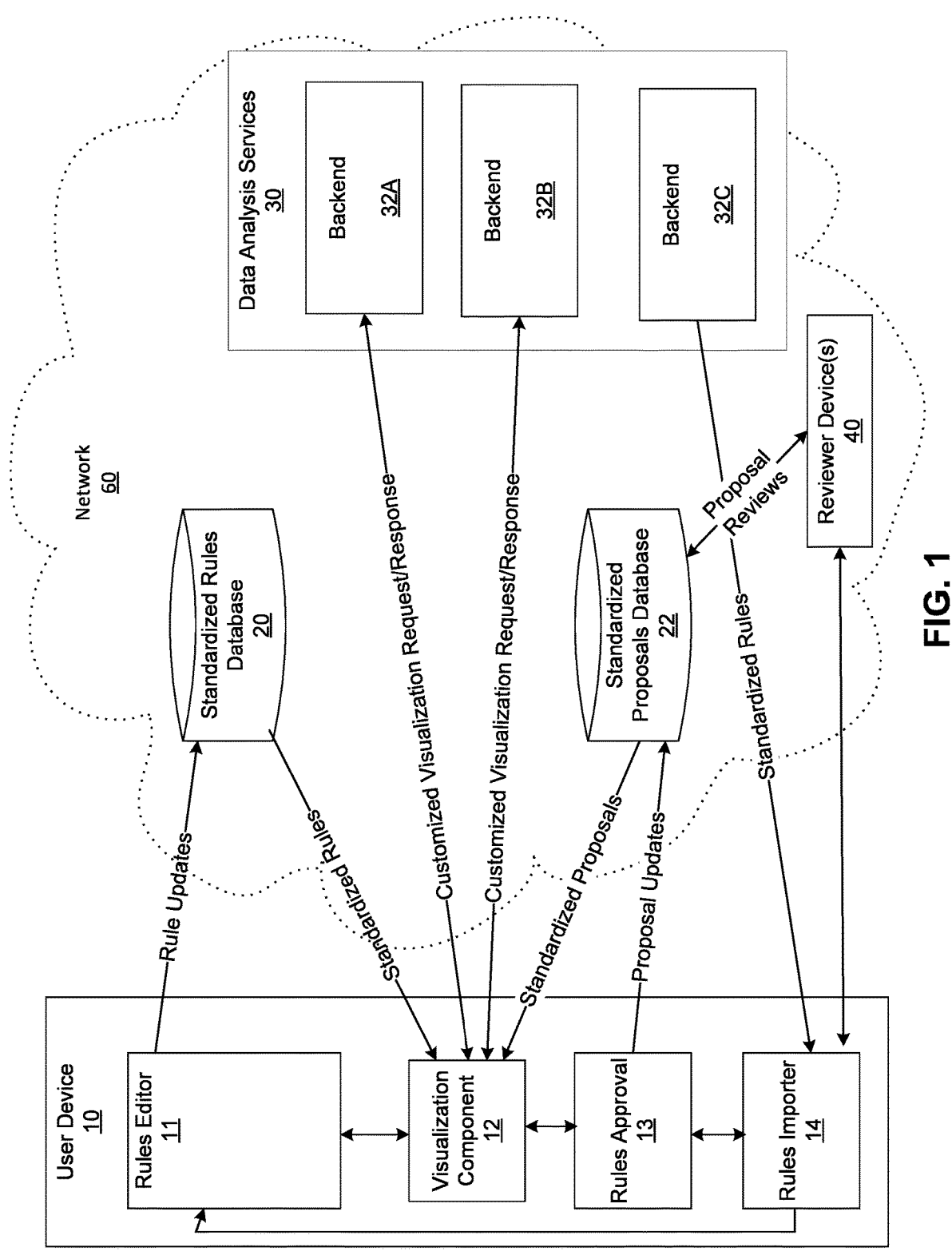
FIG. 1 is a flow diagram illustrating example components and communications in an improved rule management system.

Existing business rules and logic management systems require that coders implement and maintain the business rules and logic in code form. Many Subject Matter Experts (e.g., experts in supply chain management, oil and gas, healthcare administration, etc.) lack the time and/or technical skill to create and review the coded business rules and logic. This prevents Subject Matter Experts from easily managing, creating, and reviewing current rules or new rule proposals. These rules can represent vital information related to alerts, data categories, and other important data that can be represented by business rules.

Not only does the Subject Matter Expert have to rely on coders to implement the business logic correctly, but the Subject Matter Expert will also have to rely on coders to gather the updated rule outcomes for analysis and review. This problem is further compounded by the potential need for analysis from multiple data analysis systems regarding the rule outcomes to help the Subject Matter Expert understand the implications of a new rule or a change to an existing rule. Translating rule outcomes between multiple data analysis tools may require significant coding skills and time.

The technical solutions discussed below enable Subject Matter Experts to better manage rule changes that are time-sensitive and/or risky, while enabling more immediate review and oversight from others prior to implementation. Additionally, the technical solutions enable Subject Matter Experts to quickly evaluate the efficacy of current rules and new rule proposals, as well as analyze the interplay of multiple rule proposals and changes.

A computer system that is usable by a subject matter expert includes a frontend user interface which enables development and implementation of business rules and logic across multiple data analysis systems. The interface gives the user the ability to review potentially all existing business rules, or a subset thereof, as objects in plain language and analyze outcomes related to such rules. Similarly, the interface gives the user the ability to propose new rules or propose rule changes with minimal or no need to code.

For new rules, the user can preview the effects of the potential rule by backtesting against previous data. For proposed rule changes, the user can preview how the proposed rule compares to the current rule over past data. The ability to compare the proposed rule to the current rule gives users powerful tools for understanding the potential outcomes of a rule change. These rule previews can be visualized or outputted using multiple data analysis systems and are user-configurable to monitor and preview key output data. Such visualizations can include graphs, time series, objects, and database entries. Thus, the system can dynamically display previews in multiple forms using multiple data analysis systems by storing the rule in an intermediate format that can be quickly and easily translated to multiple data analysis systems. Similarly, key metrics relating to performance of the proposed rule can be output without a visualization.

Once the user is satisfied, the user can propose the rule or rule change for review prior to implementation. Other users, such as reviewers, can then use the interface to review proposals. For proposed rule changes, the review interface may indicate which rules had proposed changes. The review interface may show the values associated with the current rule and the new values associated with the rule proposal. These changes may be indicated by highlighting, boxing, coloration, or other visual indications. Reviewers can preview the outcomes of the proposed rule or rule change using the same data analysis systems that the rule proposer used. Reviewers can also leave suggestions or comments for the rule proposer.

Similarly, a user can import rules from other rule management software. These imported rules will be translated into the intermediate format that the software uses for rule objects. This will enable the user to use review tools on the imported rule, propose changes, and preview changes to the imported rule.

Thus, the computer system and corresponding frontend user interface enables the development, implementation, and review of business rules and the preview and acceptance of new rule proposals with minimal or no need for the creation and review of code, enabling Subject Matter Experts to more directly supervise the creation, proposal, and efficacy of business rules and logic.

Example System Overview

FIG. 1 is a flow diagram illustrating example components and communications in an improved rule management system. As shown in FIG. 1, a user device 10, such as a computing system of a subject matter expert, communicates with a standardized rules database 20 that stores rules in a standardized format. A rules editor 11 may be used by the user to create, edit, and test rules that are applied to various data sets (not shown). Advantageously, results from a rule set may be visualized and/or further analyzed by various data analysis services 30, such as backends 32 (which includes 32A, 32B, and/or 32C), as rules are created, edited, and tested.

In the example embodiment of FIG. 1, the rules editor 11 sends rule updates to the standardized rules database 20 in a standardized or "intermediate" format that may then be translated for use in each of multiple data analysis services 30. For example, a user may develop a rule set using the rules editor 11 and wish to see the results in the form of a time series graph. The rules editor 11 creates a standardized rule, such as a data object that includes the general rule criteria (conditions and metadata) in a manner that may be translated for use by multiple data analysis services. The visualization component 12 may then communicate with the various data analysis services in a format that is usable by the particular backend service. In the example of FIG. 1, the visualization component 12 requests visualization of results from application of a generated rule set from backend 32A in a format that is recognizable by backend 32A. Similarly, a request in a format that is recognizable by backend 32B may be transmitted. The backends 32A and 32B may then return user interface data that is usable by the user device 10 to generate a visualization of the resultant data, such as a time series chart from backend 32A and a tabular data set from backend 32B. Other types of backends that provide data analysis and/or visualization services may be queried in a similar manner, such as to provide the user device with various visualizations of the resultant data from application of a rule.

Example Rule Editing Interface

In one example of the rules editor 11, the user accesses a user interface (UI) known as the rule-editing interface that enables rule creation and editing. An example rule-editing interface will be discussed with reference to FIG. 2, which is a sample user interface illustrating a rule editing interface 200. In this example, the rule editing interface 200 includes a rule-listing panel 210, and a rule-editing panel 220.

The rule editing interface 200 enables the user to create new rules, view existing rules, and make suggestions for changes to existing rules. The rule editing interface 200 can enable the user to have access to a single source of truth for all rules or any subset of rules pertinent to the user's role or expertise. When creating or modifying a rule, the user can input metadata for rule identification and categorization. The user can also input conditions that limit what datasets the rule examines, manipulates, categorizes, or features. While creating or modifying the rule, the user can generate visualizations which serve as previews of how the rule works on existing or example datasets. These visualizations can include tables, line graphs, bar graphs, scatter plots, function plots, pie charts, diagrams, timelines, tree diagrams, stacked graphs, tabular data, and other data visualizations. This enables the user to understand the implications, ramifications, and possible outcomes that the rule can generate if implemented. The user can interact with the visualization to recategorize, redraw, change the shape of, or otherwise manipulate the visualization to view the underlying data in different ways.

Both the metadata and conditions of the rule can be generated through interaction with the rule-editing interface, for example by entering values into metadata or condition fields. Such interaction may not require the user to code parts of the rule. In other embodiments, the user may write some rudimentary code. These rules can be used to examine trends, generate alerts, and implement business logic in important business pipelines.

In some embodiments, when the user has created a new rule or makes suggestions for changes to existing rules, the user can submit the new/changed rule to create a proposal. The proposal can be reviewed by another user before the rule is approved and implemented.

Figure 2:
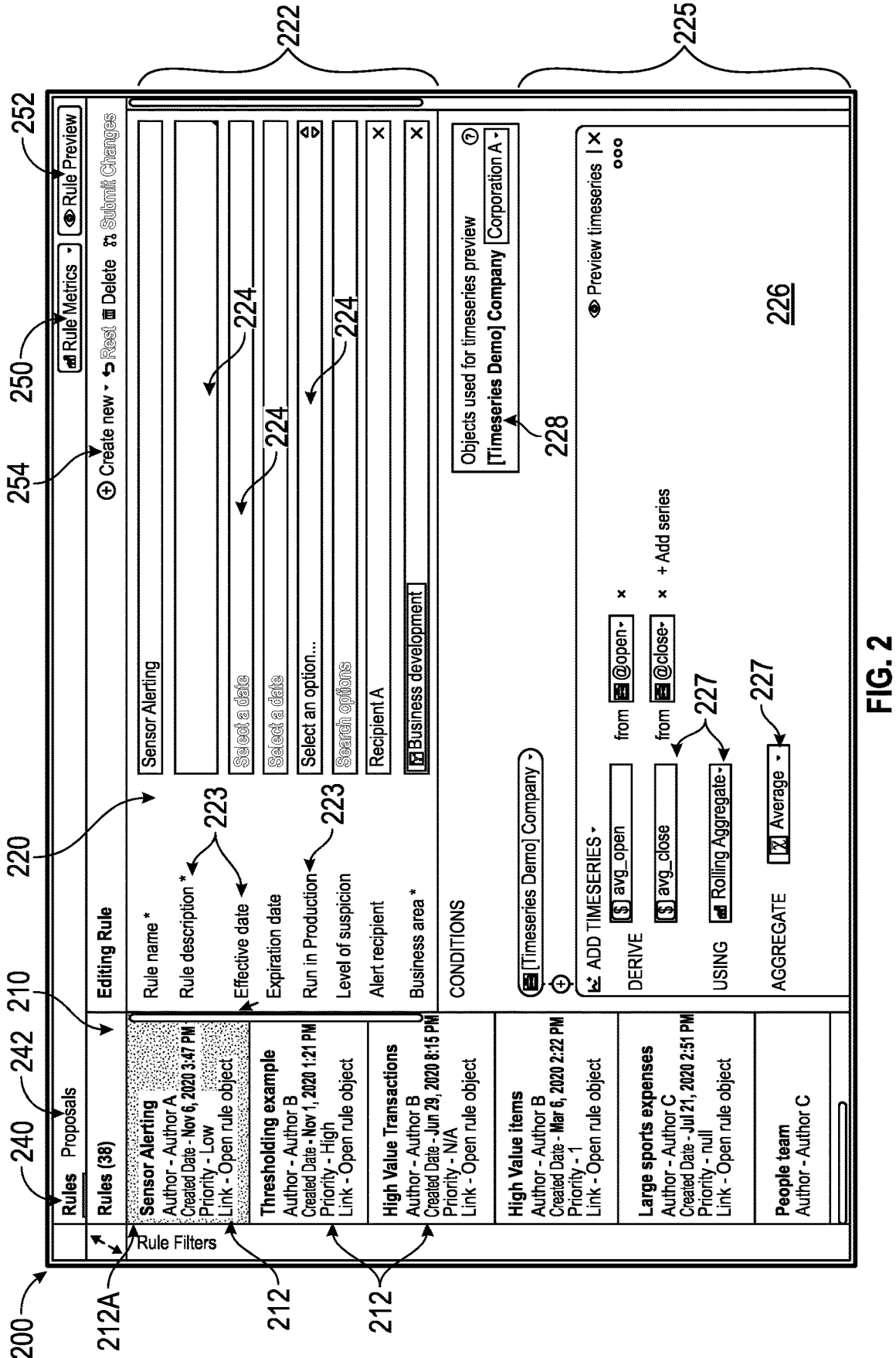
FIG. 2 is an example user interface illustrating one embodiment of a rule editing interface comprising multiple panels for editing rules and previewing results of a currently-editable rule and modifications of that rule.

In the example of FIG. 2, the rule-listing panel 210 includes rule identifiers 212 (or simply "rules 212") that represent rules in an ontology of rules stored in the standardized rules database 20. Advantageously, rules that are associated with various authors, data sets, and visualization may all be accessed in the rule editing interface 200. These rule identifiers 212 can include important information such as the name of the rule, the author of the rule, the creation date of the rule, the priority of the rule, and/or a link to an object expression of the rule. Other information can be expressed in the rule identifiers 212, such as metadata concerning the rule. Rules 212 can be sorted by various criteria including alphabetic order of the rule name, alphabetic order of the author name, date of rule creation, etc. Rules 212 can be reordered to represent an order of importance or an order of operation. Alternatively, rules 212 represent rules that are separate and independent from each other such that the order has no bearing on the entry's importance or order of operation. The rule-listing panel 210 can also include a number designation of how many rules are currently selectable in the listing of rules. Similarly, the rule identifiers 212 in the rule-listing panel 210 can be filtered to enable the user to filter down to particular sets of rules based on any criteria above such as name of the rule, author of the rule, or other metadata concerning the rule. The rule identifiers 212 in the rule-listing panel 210 may also be limited due to the access level of the user. For example, a subject matter expert in finance may only be able to view and edit rules that are designated as finance related.

The rule-listing panel 210 enables subject matter experts to have a single source of truth for all business logic and rules, or those that relate to their particular expertise. Similarly, the rule-listing panel 210 enables subject matters to easily find or filter to the business logic and rules for their particular task The rule-editing panel 220 includes a metadata area 222, a conditions area 225, and preview settings area 228 for a selected rule. In a metadata area 222, the user can add, modify, or remove metadata in metadata categories 223 corresponding to the selected rule. In the example of FIG. 2, the metadata area 222 in the rule-editing panel 220 corresponds to the Sensor Alerting rule 212A. In a metadata area 222, a user can input or select from a drop-down menu, or otherwise modify metadata in metadata categories 223 by updating the corresponding metadata fields 224. Examples of metadata categories 223 concerning the rule can include a rule name, a rule description, an effective date that the rule will be implemented, an expiration date for the rule, whether the rule will be run in production, what level of suspicion there is concerning the rule, the recipient of an alert generated by the rule, what business area is affected or should implement the rule, and the like. The user is also able to create new metadata categories with associated data entry fields. The form of data that may be input into particular metadata fields 224 may be customized by the user, such as to specify that certain fields are limited to a particular type or range of values, (e.g., characters, strings, dates, object references, integers, fractions, real numbers, shorts, ints, longs, floats, variable names, table names, data series names, etc.).

In a conditions area 225 of the rule-editing panel 220, the user can add, modify, or remove conditions corresponding to the selected rule. In the example of FIG. 2, the conditions area 225 in the rule-editing panel 220 corresponds to the Sensor Alerting rule 212A. Conditions 226 can include, for example, datasets, data categorizations, operations, filters, criteria, or formulas for generating an output dataset for the rule. The output dataset based on conditions 226 can be used to create various data visualizations, such as charts, graphs, tables, etc. While the types of conditions are unlimited, the example of FIG. 2 illustrates conditions including deriving an avg_open value based on open values in the dataset, deriving an avg_close value based on close values in the dataset, where the values are based on a rolling aggregate.

Both the metadata area 222 and condition area 225 of the rule-editing panel 220 enable Subject Matter Experts to create, modify, edit, and delete portions of rules primarily through inputting information into fields using user-friendly methods and without sophisticated knowledge for implementation of rules in computer code. This enables subject matter experts, who may have expertise in business rules or the rule's underlying subject matter, to be able to implement rules themselves without needing to work with a coder to implement their expertise into a viable rule.

Figure 3A:
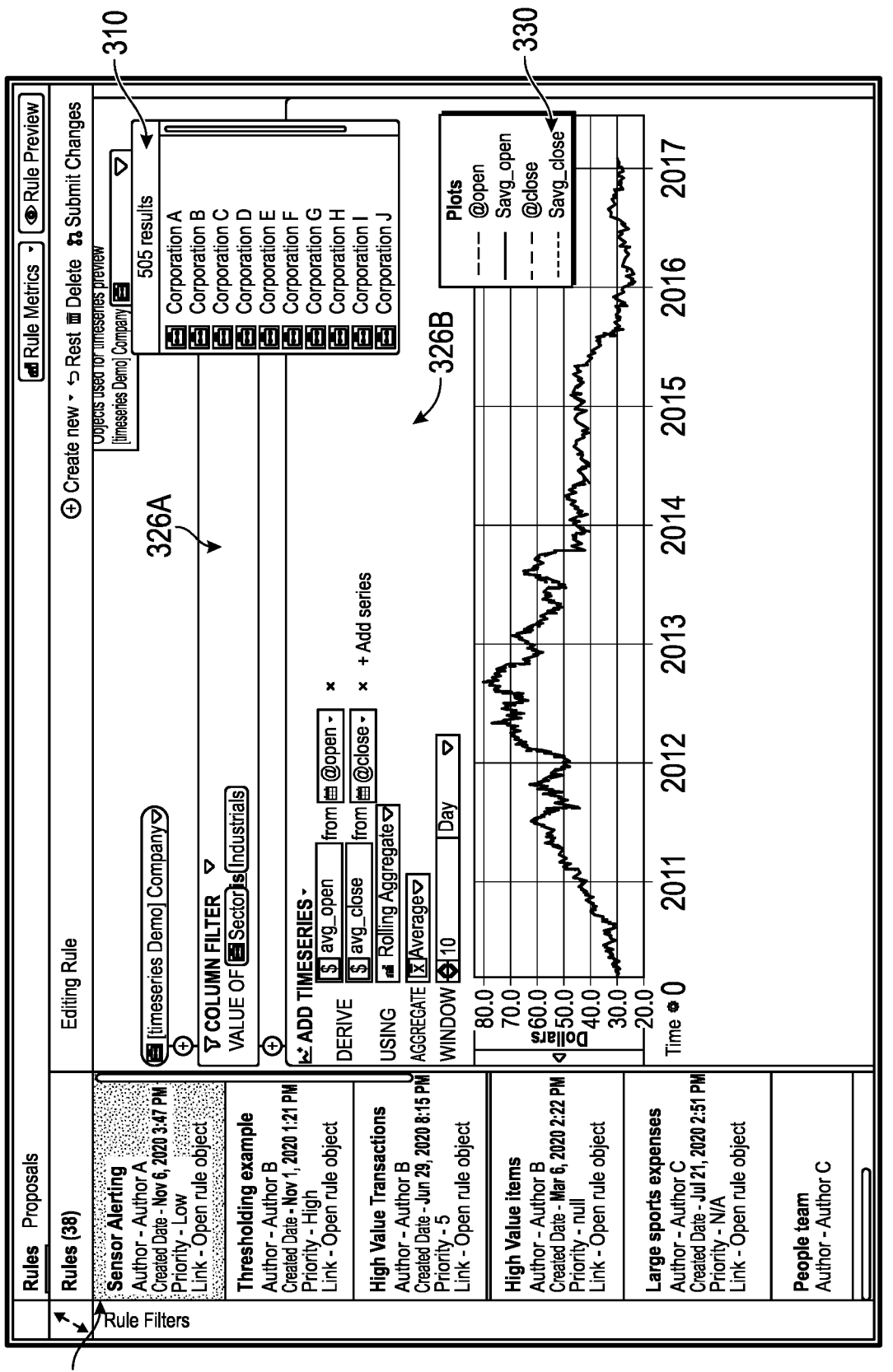
FIG. 3A is an example user interface illustrating one embodiment of condition types and creating alerts through the rule editing interface.

FIG. 3A is an example user interface illustrating additional example conditions 326 (including conditions 326A and 326B) associated with a rule 212A as a user edits rule 212A. In this example of editing rule 212A, condition 326B remains the same as condition 226 in FIG. 2. However, the rule 212A has been edited such that the input data set of company data is first filtered by condition 326A to reduce the data to companies which are classified as the "industrials" sector before condition 326B (condition 226 in FIG. 2) is applied. Condition 326B then derives an avg_open value based on open values in the filtered dataset and an avg_close value based on close values in the filtered dataset, where the values are based on a rolling aggregate.

FIG. 3A also illustrates an example user interface that presents an example visualization 330 associated with rule 212A, and more specifically with condition 326B. The output dataset from condition 326B may be used to generate a visualization 330. For example, the conditions 326A-326B may be executed on an input dataset, such as previously collected data that is stored in one or more local or external databases. As shown in FIG. 1, the visualization component 12 may request visualization data based on the output dataset from one or more backends 32. Advantageously, the output dataset may be stored in an intermediate format, such as a data object, that is compatible with each of the backends 32. In some embodiments, the visualization can be a time series graph, a time series bar graph, a table of values, a chart, or some other chart, table, or graph.

Returning to FIG. 3A, an example visualization 330 representative of an output dataset resulting from application of the rule 212A is illustrated. In this example, the visualization 330 indicates the results of conditions 326A and 326B applied to an input dataset. In some implementations, similar visualizations may be presented at any stage of the rule, such as after application of a particular condition, e.g., a visualization may be provided showing the results of condition 326A. In this example, the visualization 330 is a time series graph that may have been generated by a backend 32 responsive to a request of the visualization, as illustrated in FIG. 1.

By being able to see visualizations of the data being manipulated by the rules and conditions, subject matter experts are more easily able to understand the implications of parts of their rules and conditions. This can help subject matter expert preview potential results and craft rules and conditions that meet their criteria and expectations.

This can also allow subject matter experts to "debug" rules and conditions which may perform non-optimally prior to implementation. The flexibility of the computer system to provide the various visualizations from a single interface also allows the subject matter expert to see the pertinent data in a way that helps them understand the rule in the quickest and most efficient way possible.

Figure 3B:
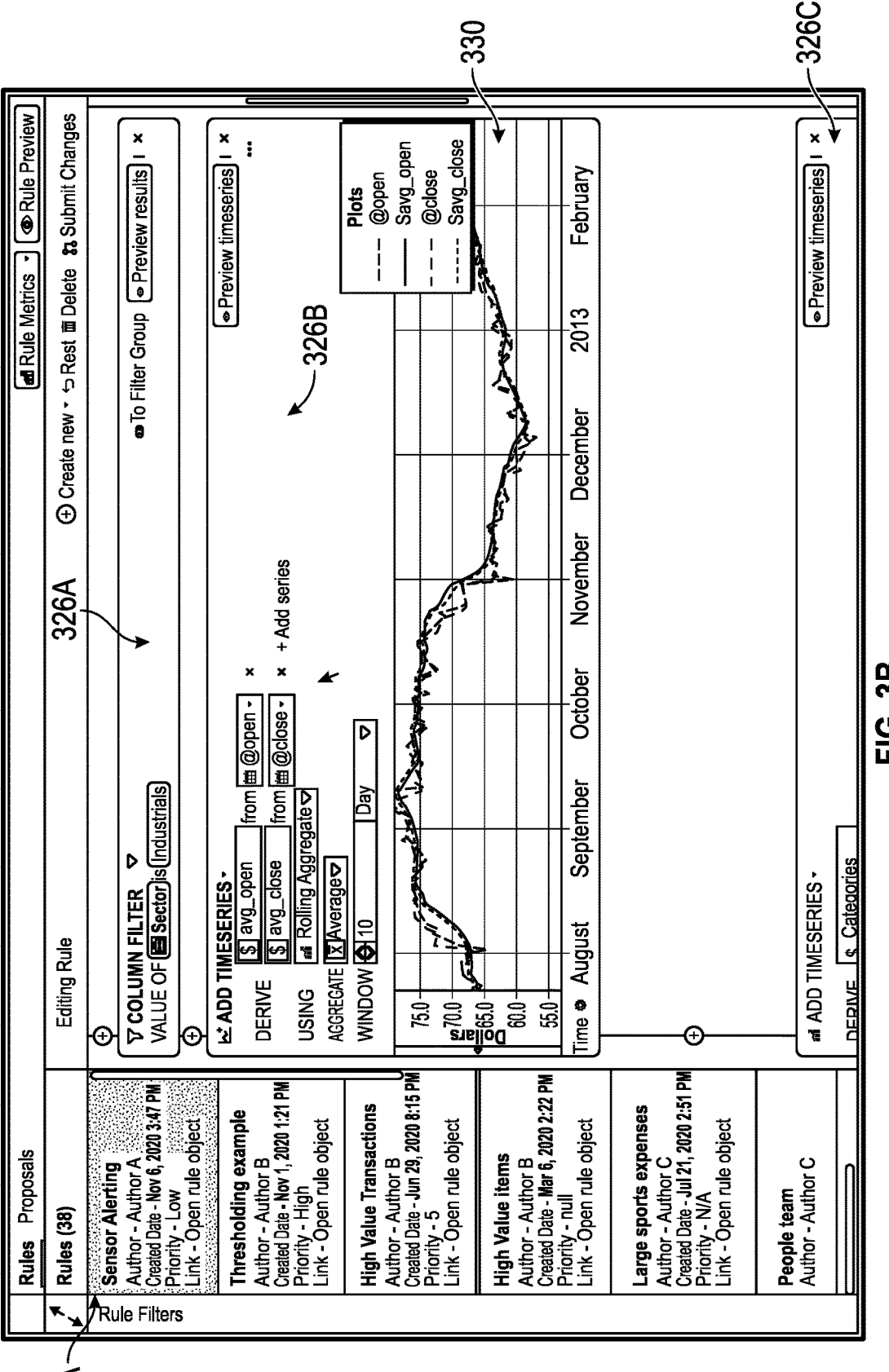
FIG. 3B is an example user interface illustrating visualizations for previewing results of a currently-editable rule and modifications of that rule on a rule editing interface.

FIG. 3B is the example user interface showing a zoomed-in portion of the visualization 330. In some embodiments, the visualizations are interactable, such that they may receive commands from users to interact with the visualization. These interactions may enable the user to better understand the data presented in the visualization or manipulate its presentation to meet the user's needs. An example manipulation of the visualization 330 in FIG. 3A is shown in FIG. 3B. In FIG. 3B, the visualization 330 has been updated to show a zoomed-in portion of the time series graph as noted by the axes of the visualization 330 in FIGS. 3A and 3B. In an embodiment, the user is able to zoom-in or zoom-out on time series data. In an embodiment, the user is able to see specific y values along certain trend lines in correspondence with the x (most likely time) values on time series data. In an embodiment, the user is able to sort tables based on the alphabetic, numerical, or other characteristics of rules in a column of the table. In an embodiment, the user is able to rearrange columns and rows of the table.

Figure 4:
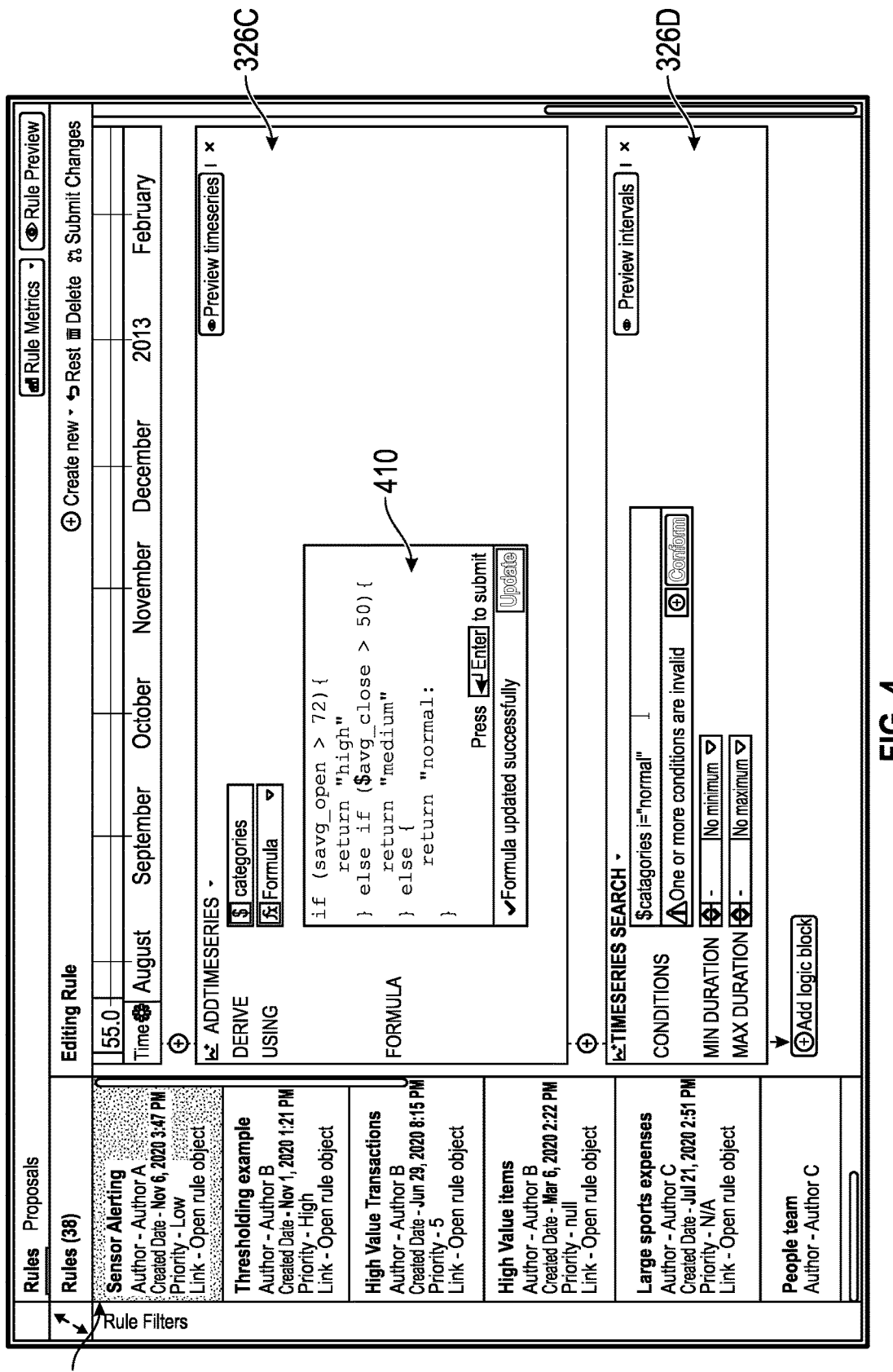
FIG. 4 is an example user interface illustrating one embodiment of modifying preview options and viewing visualizations that represent result previews of constituent conditions of a rule.

Turning to FIG. 4, which is an example user interface illustrating further conditions 326 associated with the rule 212A, condition 326C and 326D are shown. As shown in this example, the conditions 326C uses some rudimentary code, such as for tagging certain types of information. In this example, the code 410 is configured to generate tags for certain data points as "high," "medium." or "normal". The tags generated by the code 410 may then be used in condition 326D as part of a filter, to select those data items tagged as "normal" in this particular example.

Figure 5:
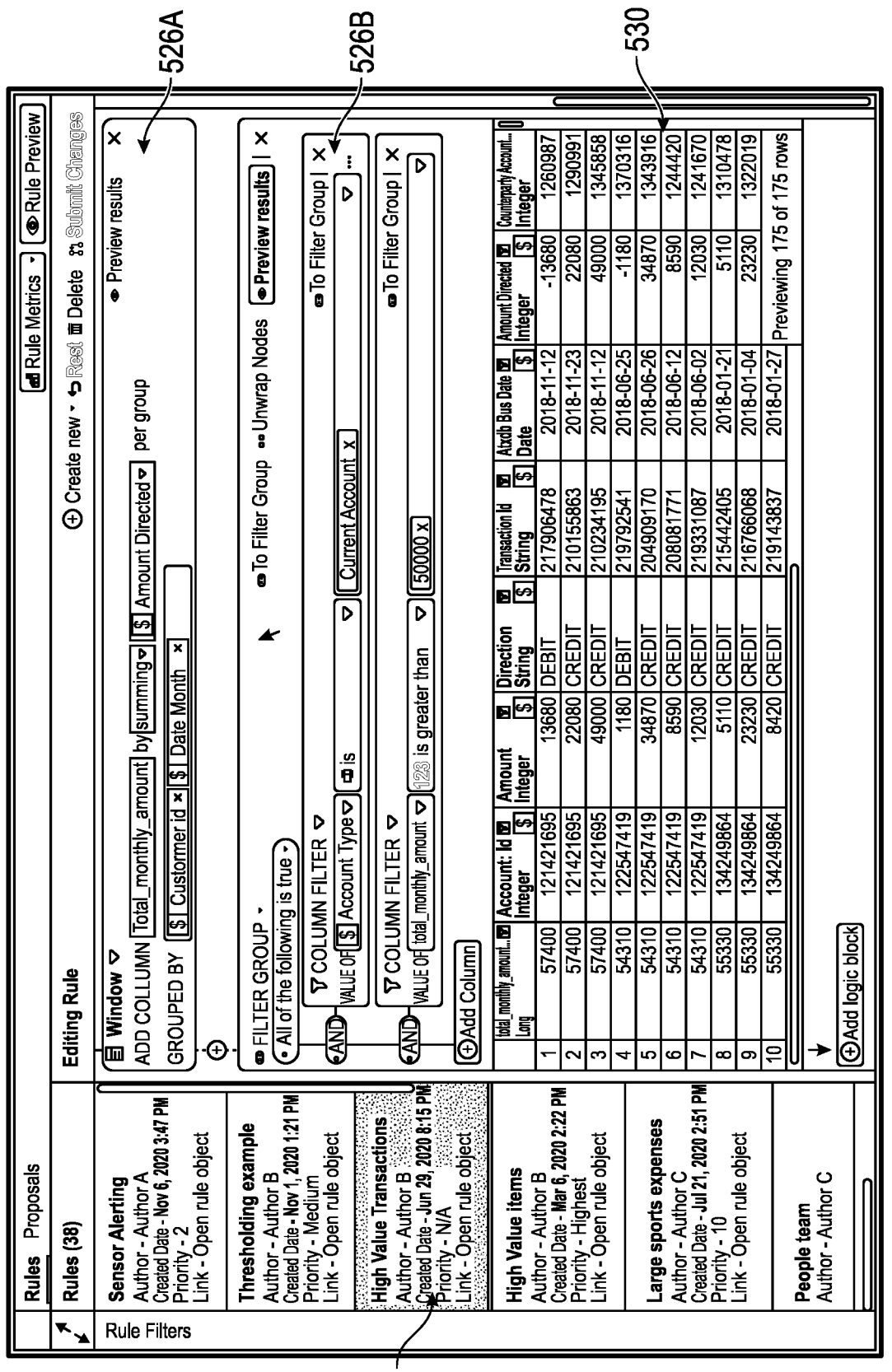
FIG. 5 is an example user interface illustrating user manipulation of the visualization representing previews of constituent conditions of a rule.

FIG. 5 is another example of a user interface, instead illustrating another example rule 212C titled "High Value Transactions." This rule 212C is at least partially composed of conditions 526A and 526B. Condition 526A adds a new column of data, total_monthly_amount, to the input data Transactions (not pictured in FIG. 5) by summing the Amount Directed (a variable from the input data) for each group where grouping was determined by Customer ID and Date Month (also variables from the input data). Condition 526B then filters for data where the value of the variable Account Type is Current Account and the total_monthly_amount is greater than 50000. Visualization 530 is then shown when the user clicks the preview results button for condition 526B. In this example, visualization 530 is a table of values.

Visualizations, such as example visualizations 330 and 530, can be easily obtained because the rule is formatted into an intermediate form in the standardized rules database 20 for dispatch to the data analysis services 30. By formatting the standardized rules into an intermediate form, the storage layer and the computational layer are abstracted to give flexibility and speed to the rules editor. Additionally, this makes getting different visualizations quick and easy for subject matter experts who don't have to rely on coders to manipulate the dataset to output different visualizations.

Users can also create conditions that will generate alerts based on certain conditions of input data. These alerts can be directed to users in real-time or they can be analyzing circumstances when certain alert conditions resulted and triggered alerts. These alerts can help users ascertain if existing policies, conditions, or rules are meeting their criteria and parameters.

Returning to FIG. 2, the rule-editing panel also comprises preview settings area 228. Users can input, select from a drop-down menu, or otherwise modify settings concerning previews generated by conditions in the rule-editing panel. For example, the user can adjust the input dataset, such as by selecting one or more of the Corporations in the Object selection interface 310 of FIG. 3A. As the input dataset is adjusted, e.g., to select Corporation C rather than Corporation A, the visualization 330 is updated in realtime. This enables the user to manage the preview to show a subset of possible example data for easier digestion of the visualization.

Figure 8:
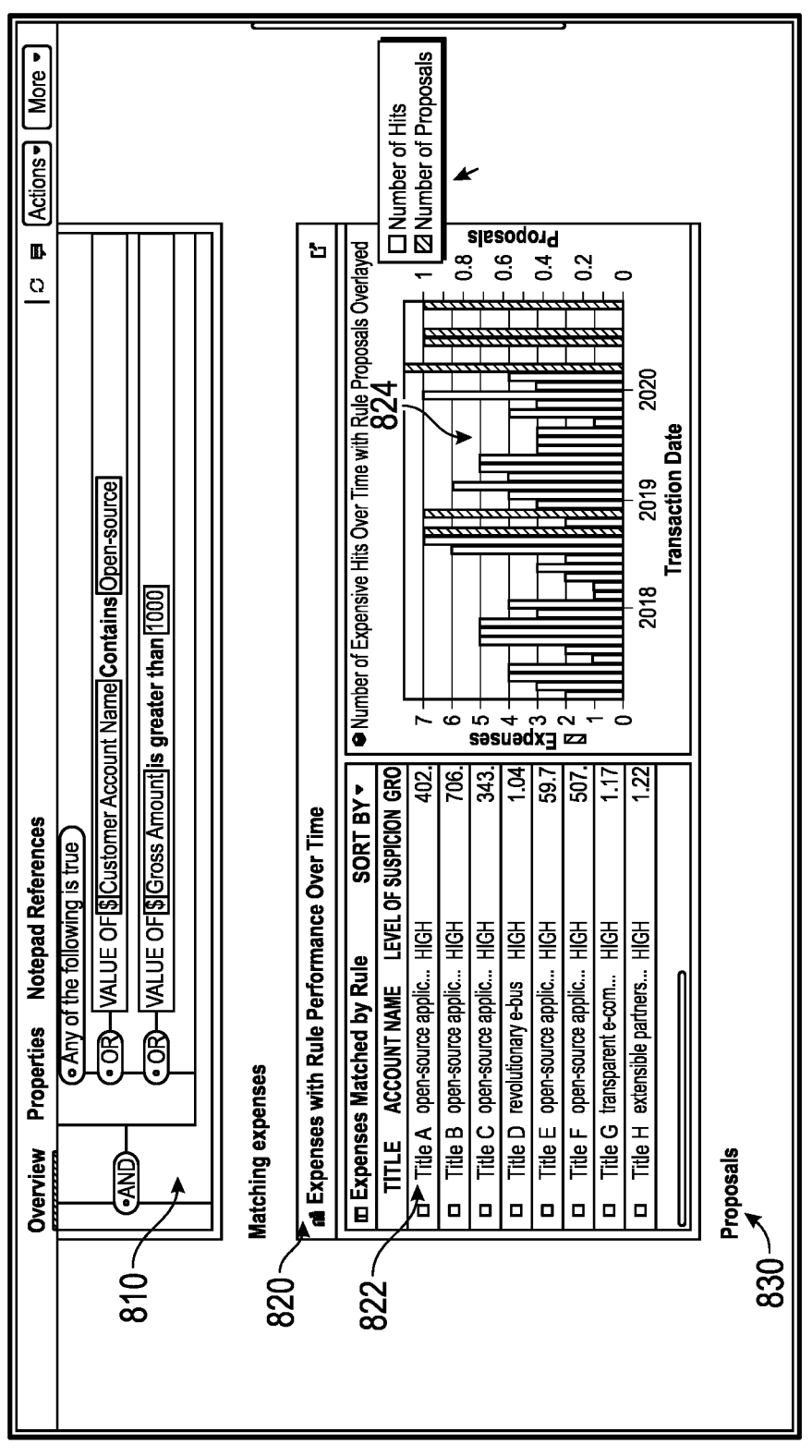
FIG. 8 is an example user interface illustrating one embodiment for checking the performance of a rule before and after changes to the rule have been made.

Using the rule metrics option 250, users are able to initiate display of an interactive user interface, such as FIG. 8, for example, indicating metrics associated with effectiveness of the rule, utility of the rule, breadth of transactions or data that the rule covers, and/or other aspects of the rule. Users are able to modify which metrics are shown for each rule. In some embodiments, metrics are not shown for the rule. These features enable a user to quickly ascertain the effectiveness of a rule with regards to their metrics and see how modifications to the rule could affect outcomes.

Using the rule preview button 252, the user may initiate display of any type of visualization that can be seen with relation to conditions of the rule as described above. These visualizations can relate to all data related to the rule or to a subset of the data related to the rule.

Example Rule Import

Using the create new rule button 254, users can either create a rule from scratch or import a rule. With reference to FIG. 1, when creating a new rule the user can create a rule from scratch using the Rules Editor 11. Alternatively, the user can import a rule from some other rule database or system using the Rules Importer 14. When importing a rule, a user can import a rule from another rule database, or from a file, or from a logical representation. In some embodiments, the new rule can be based on a standard template or a template created by a user. These imported rules will be translated into the intermediate format that the software uses for rule objects and added to the standardized rule database 20. This will enable the user to use review tools on the imported rule, propose changes, and preview changes to the imported rule.

After creating or importing a new rule, the user is able to submit a proposal for review to the standardized proposals database 22. One or more reviewers on reviewer device(s) 40 will then be able to review the proposal from the standardized proposal database 22. Proposals and reviews for proposals will be discussed in relation to the Rule Proposal Interface below.

Example Rule Proposals and Approvals

When a user has finished creating a new rule or editing an existing rule, the user can submit the new rule or edited rule. This submission is called a proposal. Proposals can be reviewed by another user or reviewer prior to being accepted. When a proposal is reviewed and accepted, the new rule or edited rule will be updated in the rule database.

When submitting changes to a rule, a user may see a view corresponding to a proposal view on the rule proposal interface as outlined below. This proposal view may indicate what changes were made by the user. When the rule change is submitted, a proposal is created for review. Similarly, when submitting changes to a rule, a user may be able to leave comments for the proposal reviewer.

Returning to FIG. 1, the rules approval component 13 is configured to interface with other user devices, such as reviewer devices 40 to provide rules for approval and to track required approvals. The rules approval component 13 also communicates with the standardized proposals database 22. The rules approval component 13 sends proposal updates to the standardized proposals database 22. The proposals are stored in a standardized or "intermediate" format that may then be translated for use in each of multiple data analysis services 30. For example, a reviewer may be reviewing a user-created rule and wish to see the results in the form of a bar graph. The standardized proposals database 22 communicates a proposal in a standardized form to the visualization component 12, which in turn communicates with the various data analysis services in a format that is usable by the particular backend service. This process is similar to when a user generates visualizations of data for rule creation and rule-editing.

In one example of the rules approval component 13, the user accesses a UI known as the rule proposal interface that enables reviewing proposals for new or modified rules in the standardized proposals database 22. An example rule proposal interface will be discussed with reference to FIG. 6. The reviewer can access the rule proposal interface to review and accept proposals for new and changed rules. The rule proposal interface enables the user to view existing proposals and review proposed changes to rules. The rule proposal interface can enable the reviewer to have access to a single source of truth for all proposals or any subsets of proposals pertinent to the reviewer's role or expertise.

The rule proposal interface enables the reviewer to view metadata concerning the rule and the associated proposal including the rule's author, the proposal's author, and other data used for categorization and identification of the rule and the proposal. The rule proposal interface also enables the reviewer to view the original rule and the proposed changes to the rule. The proposed changes can include changes to metadata, adding or removing conditions, or changing values within conditions. The proposed changes to the rule can be viewable side-by-side with the original rule. The proposed changes may be highlighted, color-coded, textually modified, textually tagged, visually tagged, or otherwise indicated. The reviewer can also generate visualizations to preview how the rule works on existing or example datasets.

After the reviewer is satisfied that the proposal for a new/modified rule should be implemented, the reviewer can accept the proposal. Once the requisite approvals are received (e.g., one or more approvals from particular individuals and/or individuals with particular roles), the rule is updated in the standardized rules database 20. In some embodiments, the reviewer is able to generate a new proposal by making changes to the proposal.

In the embodiment of FIG. 2, the proposal review link 242 may be selected to switch to the rule proposal interface 600 (to be discussed below) from the rule editing interface 200. Likewise, from the rule proposal interface 600, the rules link 240 may be selected to switch to the rule editing interface 200. In some embodiments, only privileged users are able to switch to the rule proposal interface 600.

Figure 6:
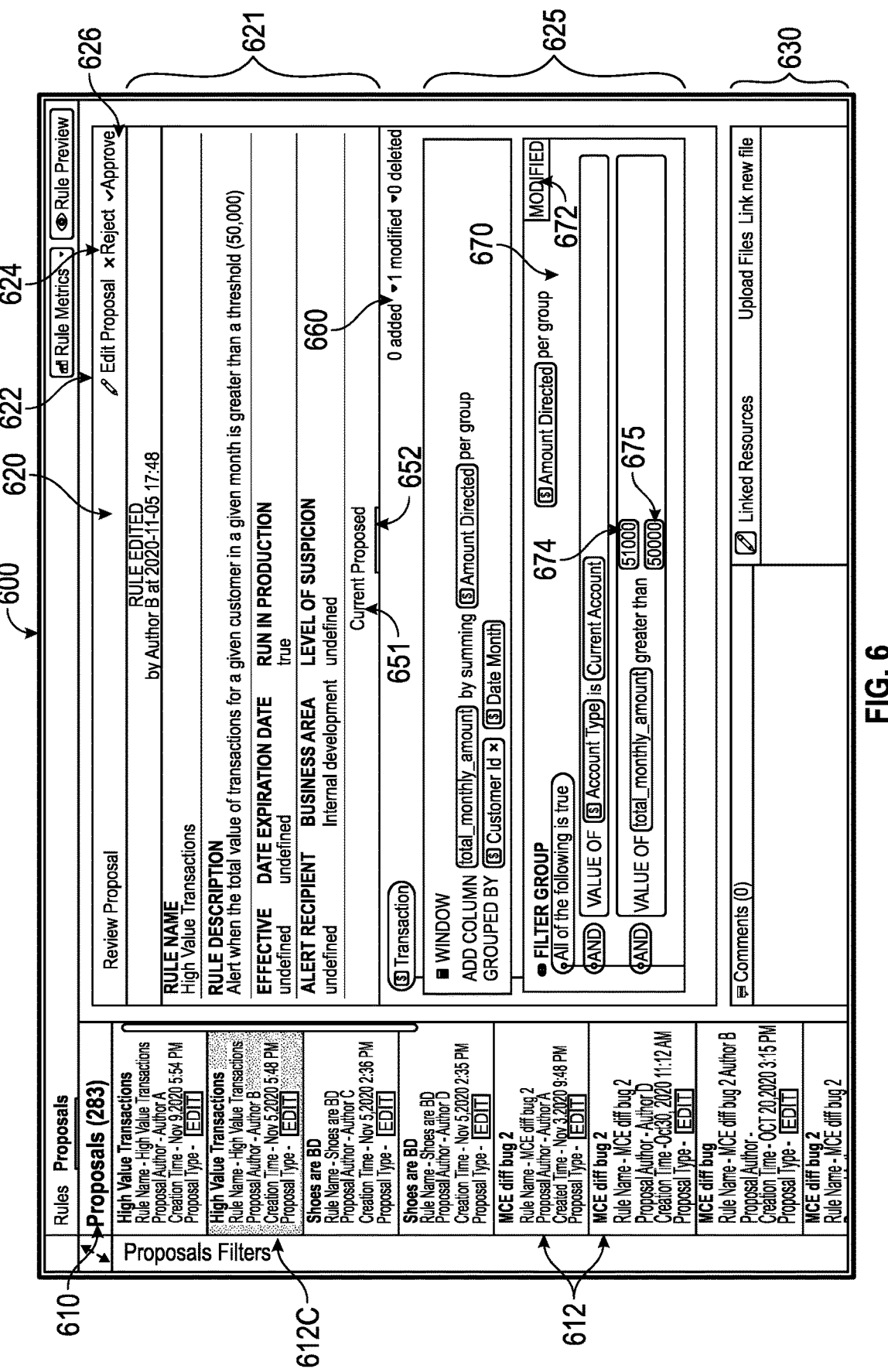
FIG. 6 is an example user interface illustrating one embodiment of a proposal reviewing interface comprising multiple panels for reviewing proposals for changes to rules.
Figure 7:
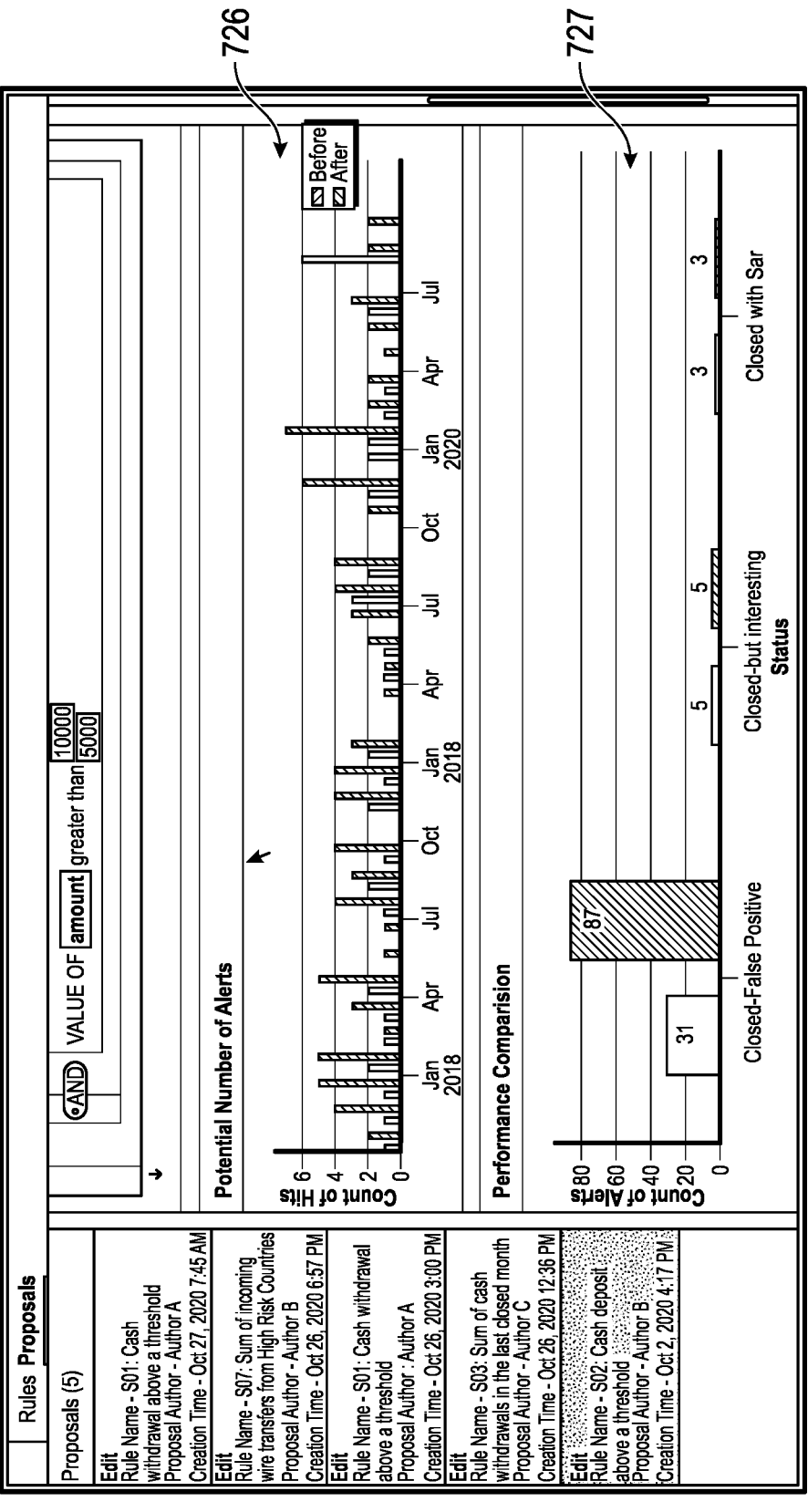
FIG. 7 is an example user interface illustrating one embodiment where a reviewer can backtest the original rule against the proposed rule through the proposal reviewing interface.

FIG. 6 is a sample user interface illustrating a rule proposal interface 600. In this example, the rule proposal interface 600 includes a proposal-listing panel 610, and a proposal-reviewing panel 620.

In this example of FIG. 6, the proposal-listing panel 610 includes proposals identifiers 612 (or simply "proposals 612") that represent proposals 22 for changes to standardized rules 212. For example, rule proposal 612C corresponds to rule 212C. Advantageously, rules that are associated with various rule authors, various proposal authors, data sets, and visualizations may all be accessed in the rule proposal interface 600. Similar to the rules 212 discussed above, these rule proposals 612 can include various summary information regarding rules and the proposal changes to the rule, such as name of the proposal, proposal name, proposal author, rule author, rule creation date, proposal date, proposal type, rule priority, link to an object expression of the rule, rule metadata, and the like. Similar to the rules 212, the rule proposals 612 can be sorted and/or filtered in various manners. For example, the rule proposals may be sorted (e.g., alphabetically or numerically) by rule name, rule author, proposal author, creation date, proposal date, etc. Rule proposals 612 can be reordered to represent an order of importance. Alternatively, rule proposals 612 represent proposals that are separate and independent from each other such that the order has no bearing on the entry's importance. Similarly, the rule proposals 612 in the proposal-listing panel 610 can be filtered, such as through a filtering UI (not shown), to enable the user to filter down to particular sets of proposals based on any criteria above such as name of the rule, author of the rule, author of the proposal, or other metadata concerning the proposal. The rule proposals 612 in the proposal-listing panel 610 may also be limited due to the access level of the user. For example, a subject matter expert in finance may only be able to view and edit proposals that are designated as finance related. In the example of FIG. 6, the proposal-listing panel 610 includes a proposal count indicating a number of proposals that are currently selectable by the user (and which may vary based on the user or user role) in the listing of proposals.

The proposal-listing panel 610 enables reviewers, who may be subject matter experts, to have a single source of truth for all proposals for changes to business logic and rules and/or new rules. Similarly, the proposal listing panel 610 also enables reviewers to see proposals that relate to their particular expertise by filtering based on metadata related to the proposal or associated rule.

The proposal-reviewing panel 620 includes a metadata area 621 a conditions area 625, and a review communications area 630. In the example of FIG. 6, the metadata and conditions in the proposal-reviewing panel 620 corresponds to the High Value Transactions proposal 612C, which correspond to the original rule 212C. For example, the Current Rule conditions may be displayed in response to selection of Current Rule link 651 and the Proposed Rule conditions may be displayed in response to selection of Proposed Rule link 652. As shown in FIG. 6, the proposal-reviewing panel 620 includes proposed changes to a rule. Proposals with proposed changes can include changes to the metadata or the conditions of associated rule, modified metrics used to assess a rule or changes to include new metadata, new conditions, or new metrics in the associated rule. Proposed changes can also include deletions of metadata, conditions, or metrics.

In the proposal-reviewing panel 620, the proposed changes to the associated rule can be designated in multiple ways. In the example of a proposal to modify a rule illustrated in FIG. 6, there is a change summary 660 indicating the total number of additions, modifications, and deletions associated with the current rule. The labels of the change summary can be color coded. Examples of this color coding could be that additions are expressed in green font, modifications are expressed in yellow font, and deletions are expressed in red font. In other embodiments, these labels can be expressed in fonts of other colors.

The proposed changes themselves can also be designated by color. For example, additions to the metadata, conditions, or other parts of the rule or new values can be expressed with a first visual indicator, such as a particular font, color, size, glow, etc. A second visual indicator may be used to designate modifications to values of fields in the metadata, conditions, or other parts of the rule. Similarly, a third visual indicator can be used to designate deletions in the metadata, conditions, or other parts of the rule. Thus, in an example embodiment, new values may be displayed in green font, modifications may be displayed in a yellow font, and deletions may be displayed in a red font. In some embodiments, the color used to designate a proposed change may be used to highlight the text, serve as a background to the text, or box the text. For example, a modification to values of fields in the metadata, conditions, or other parts of the rule can be highlighted in yellow while additions can be highlighted in green.

Similarly, when there are proposed changes to a specific condition, the condition can be designated. FIG. 6 shows an example of a modified condition 670. For example, if one field in a condition is modified to a new value then the modified condition 670 can have a label 672 indicating the condition is modified, and the whole condition could be visually distinguished, such as by a border of a particular color (e.g., yellow), shading, color, and the like. Similarly, if a condition has been added to the rule, then the condition could be visually distinguished, such as with a border of another color (e.g., green) and/or labeled as "added." Alternatively, this label could indicate the types and number of modifications made in the condition.

In some embodiments, the designation of a modifications of a field in a condition or metadata can be shown by putting the proposed value 674 and current value 675 next to each other. The proposed value 674 and current value 675 can be visually distinguished, such as by color. For example, the proposed value 674 may be in a green font while the current value can be in a red font. Alternatively, the proposed value could have a border of a first color (e.g., yellow), while the current value could have a border of another color (e.g., gray). Any combination of visual effects, such as font color, bordering, highlighting, etc., can be used to distinguish the proposed value 674 and the current value 675. In some embodiments, switching between the current rule using the Current Rule link 651 and the proposed rule using the Proposed Rule link 652 changes the color designations for proposed changes.

In the review communications panel 630, the reviewer and others can leave comments concerning the proposal, the proposed changes in the rule, or the original rule. Similarly, the reviewer and others can upload files or leave links to other important information. In some embodiments, the interface shows proposals as objects that can be accessed by various systems, such as to provide visualizations of the proposals. These objects may include metadata including the status of the proposal, the author of the proposal, an indication of whether the proposal was submitted, and the like.

Once reviewers have reviewed the proposal, reviewers can edit, reject, or accept the proposal. Using the edit proposal button 622, the reviewer may edit conditions, metadata, etc. of the proposal. Modifying the proposal may create a new proposal and reject the existing proposal. Alternatively, editing the proposal may simply modify the existing proposal. Reviewers can also reject the proposal by using the reject proposal button 624 or approve the proposal by using the approve proposal button 626. When a proposal to change a rule is approved, the associated rule is changed in the standardized rules database 20. When a proposal for a new rule is approved, the associated rule is added to the standardized rules database 20. under the proposed rule because, for example, the visualization is too crowded with data to be digestible by the reviewer. In such an example, the visualizations presented in the rule proposal interface 600 may only show the output datasets under the proposed rule. Alternatively, the visualizations may only show the output datasets under the current rule.

Similarly, the visualizations presented in the rule editing interface 200 as seen in FIGS. 3A and 3B can similarly output datasets using both the original rule and the rule as edited. This can highlight the similarities and differences in the original rule and the edited rule for user as they are editing the rule.

Example Rule Object Interface

Users and reviewers can also examine the rule itself to assess its performance in a rule object interface, such as sample rule object interface 800. The rule object interface 800 includes a rule object panel 810, a rule performance panel 820, and a proposal panel 830.

The rule object panel 810 contains the associated metadata and conditions of the rule. The metadata and conditions viewable in the rule object panel 810 include the metadata and conditions viewable in the rule-editing interface and the proposal-reviewing interface. In some embodiments, the rule object panel 810 includes metrics information as well as targets and goals for the metrics. In some embodiments, the rule object panel 810 can be customized to show only certain metadata and conditions.

The rule performance panel 820 helps a user to view the performance of the rule. The rule performance panel 820 can include visualizations 822, 824 to show information regarding rule performance. For example, visualization 822 indicates types of expenses that were matched by the rule, including number of alerts generated, suspicion level, amount of transactions falling within the scope or the rule, or how much money or how many resources are affected by the rule. The example visualization 824 indicates the number of hits generated by the rule and the number of proposals for the rule over a time period (2+ years in visualization 824). The accepted changes can also be shown in the rule performance panel, in addition to or in place of the number of proposals, for example.

The proposal panel 830 can also show proposal changes to the rule. The rules can have a status indicator which indicates that the associated proposal is pending, accepted, or rejected. The rules can also have other important metadata related to the proposal. The proposal panel 830 enables reviewers and other users to keep track of proposals and the status of those proposals.

Interface Modification Features

A user can modify the layout of the various interfaces of the system. This enables users to craft an interface that matches their industry or professional needs such that the information they need most urgently can be displayed more effectively.

In modifying the interfaces, a user can determine what types of metadata the user can enter for certain rules. For example, for a user may configure the rule editing interface 200 to include a metadata field labeled "locations" which takes fields that are objects which represent locations pertinent to the rule such as office locations or worksite locations.

Similarly, a user may modify the rule proposal interface 600 to present metrics. For example, the rule proposal interface 600 may be updated by a user to include four metrics used to evaluate the efficacy of rules in a certain business area or under a certain level of suspicion.

This interface modification feature allows users to customize each interface to work ideally for their particular pipelines and use cases. The interface modification feature can also be used to create different instances of interfaces based on data input into the metadata of a rule. For example, if a rule is categorized as "internal development" for the "business area" as seen in the example in FIG. 6, then perhaps a new metadata field for "alert recipient" appears in the interface such that the user can now define that metadata field.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code." "instructions." "module." "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such as application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
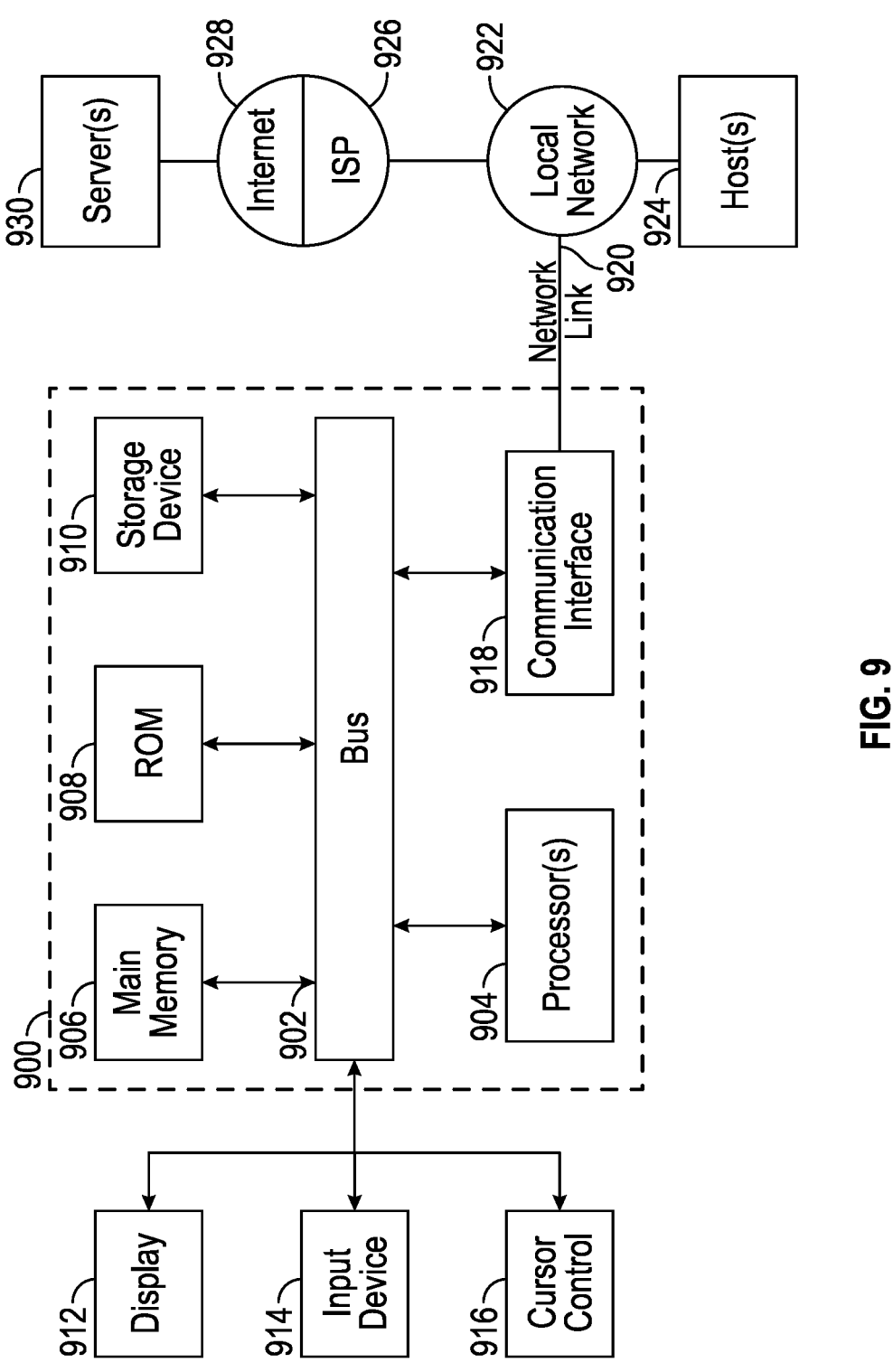
FIG. 9 is a block diagram illustrating an example computing system configured to for rule creation and proposal review.

For example, FIG. 9 is a block diagram that illustrates a computer system 900 upon which various embodiments may be implemented. For example, the network 60 (FIG. 1) may include some or all of the components and functionality discussed with reference to the computer system 900. Similarly, each of the other computing systems discussed herein, such as the user device, backends, reviewer devices, etc., may include some or all of the components of the computer system 900.

Computer system 900 includes a bus 902 or other communication mechanism for communicating information, and a hardware processor, or multiple processors, 904 coupled with bus 902 for processing information such as data entries from one or more data stores. Hardware processor(s) 904 may be, for example, one or more general purpose microprocessors configured to execute data propagation and mapping instructions.

Computer system 900 also includes a main memory 906, such as a random access memory (RAM), cache and/or other dynamic storage devices, coupled to bus 902 for storing data entries and instructions to be executed by processor 904. Main memory 906 also may be used for storing temporary variables or other intermediate information during execution of data propagation and mapping instructions to be executed by processor 904. Such instructions, when stored in storage media accessible to processor 904, render computer system 900 into a special-purpose machine that is customized to perform the operations specified in the data mapping and propagation instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and data propagation and mapping instructions.

Computer system 900 may be coupled via bus 902 to a display 912, such as a cathode ray tube (CRT) or LCD display (or touch screen), for displaying graphical user interfaces or data entry information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the identifying, filtering, mapping, and transmitting techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the identifying, filtering, mapping, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information. In some embodiments, communication interface 918 may allow computing system 900 to receive and transmit data entry information from one or more data stores.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In some embodiments, computing system 900 may receive and transmit data entry or data set information from one or more databases across network link 920.

The received code may be executed by processor 904 as it is received, and/or stored in storage device 910, or other non-volatile storage for later execution. The received data entry or data set information may be stored in storage device 910 and manipulated, analyzed, or processed by processor 904 according to data propagation and mapping instructions stored in or received by computing system 900.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can." "could." "might." or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z." unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:

determining a proposed rule indicating one or more modifications to a first rule of a plurality of rules stored in a rules database that is accessible by a plurality of users;

determining a first output data set, based on application of the proposed rule to an input data set;

determining a second output data set, based on application of the first rule to the input data set;

determining, for each of a plurality of historical time periods, a first quantity of matches in the first output data set and a second quantity of matches in the second output data set; and generating one or more metrics indicative of effectiveness of the proposed rule, the one or more metrics including comparison of the first quantity of matches and the second quantity of matches for at least some of the plurality of historical time periods;

providing, via an electronic communication network, the one or more metrics to another user that is authorized to approve the proposed rule;

in response to receiving approval of the proposed rule, updating the rules database by replacing the first rule with the proposed rule, wherein the proposed rule is stored as an object in an ontology of objects, wherein the object storing the proposed rule is an intermediate representation usable by each of a plurality of data visualization applications to generate a variety of visualization types; and generating an alert based on the proposed rule in the rules database.

2. The computerized method of claim 1, wherein the visualization types include one or more of a data set, time series, graph, object, or series of database rules.

3. A computing system comprising:

a hardware computer processor; and a non-transitory computer readable medium having software instructions stored thereon, the software instructions executable by the hardware computer processor to cause the computing system to perform operations comprising:

determining a proposed rule indicating one or more modifications to a first rule of a plurality of rules stored in a rules database that is accessible by a plurality of users;

determining a first output data set, based on application of the proposed rule to an input data set;

determining a second output data set, based on application of the first rule to the input data set;

determining, for each of a plurality of historical time periods, a first quantity of matches in the first output data set and a second quantity of matches in the second output data set;

generating one or more metrics indicative of effectiveness of the proposed rule, the one or more metrics including comparison of the first quantity of matches and the second quantity of matches for at least some of the plurality of historical time periods;

providing the one or more metrics to another user that is authorized to approve the proposed rule;

monitoring communications from the another user indicating feedback regarding the proposed rule; and in response to receiving approval of the proposed rule, updating the rules database by replacing the first rule with the proposed rule, wherein the proposed rule is stored as an object in an ontology of objects, wherein the object storing the proposed rule is an intermediate representation usable by each of a plurality of data visualization applications to generate a variety of visualization types.

4. The computing system of claim 3, further comprising: receiving a further update to the proposed rule from the another user.

5. The computing system of claim 3, further comprising: providing a visualization comparing the first quantity of matches and the second quantity of matches for at least some of the plurality of historical time periods.

6. The computing system of claim 5, wherein the visualization allows simultaneous viewing of one or more changed values between the first output data set and the second output data set.

7. The computing system of claim 5, wherein the visualization types include one or more of a data set, time series, graph, object, or series of database rules.

8. The computing system of claim 1, further comprising: generating an alert based on the proposed rule in the rules database.

\* \* \* \* \*